United States Patent [19]

Robinson et al.

[11] Patent Number: 4,789,529

[45] Date of Patent: Dec. 6, 1988

[54] RECOVERY OF ZINC FROM ZINC BEARING SULPHIDIC ORES AND CONCENTRATES BY CONTROLLED OXIDATION ROASTING

[75] Inventors: Murry C. Robinson, Don Mills; Donald W. Kirk, Oakville; Bruce Jue, Don Mills, all of Canada

[73] Assignee: Materials-Concepts-Research Limited, Don Mills, Canada

[21] Appl. No.: 840,796

[22] Filed: Mar. 18, 1986

[30] Foreign Application Priority Data

Mar. 21, 1985 [GB] United Kingdom ................. 8507302
Jun. 20, 1985 [GB] United Kingdom ................. 8515615

[51] Int. Cl.⁴ .............................................. C01G 9/00
[52] U.S. Cl. .................................... 423/109; 423/27;
 423/101; 423/110; 423/150; 423/153; 423/154;
 75/2; 75/7; 75/101 R; 75/117; 75/120; 75/121
[58] Field of Search .................... 75/2, 7, 120, 101 R,
 75/121, 117; 423/150, 153, 154, 109, 101, 110, 27

[56] References Cited

U.S. PATENT DOCUMENTS

| | | | |
|---|---|---|---|
| 1,696,188 | 5/1927 | Campbell | 423/100 |
| 1,749,125 | 4/1930 | Brinker | 423/110 |
| 2,797,987 | 7/1957 | Quintin | 423/110 |
| 3,181,944 | 5/1965 | Brooks | 423/99 |
| 3,515,510 | 6/1970 | Winter | 423/109 |
| 3,857,767 | 12/1974 | Gabler Jr. et al. | 75/101 R |
| 4,071,357 | 1/1978 | Peters | 75/103 |
| 4,105,743 | 8/1978 | Reinhardt et al. | 423/150 |
| 4,124,462 | 11/1978 | Reinhardt et al. | 423/109 |
| 4,168,969 | 9/1979 | Pepper et al. | 75/120 |
| 4,201,748 | 5/1980 | Swinkels et al. | 423/27 |
| 4,242,124 | 12/1980 | Makipirtti | 75/7 |
| 4,440,569 | 4/1984 | Weir et al. | 423/150 |
| 4,497,778 | 2/1985 | Pooley | 423/150 |
| 4,585,477 | 4/1986 | Mioen | 423/154 |
| 4,663,279 | 5/1987 | Miyashita et al. | 423/100 |

FOREIGN PATENT DOCUMENTS 1177257 11/1984 Canada .
 401328 9/1924 Fed. Rep. of Germany .
1199506 8/1965 Fed. Rep. of Germany .

OTHER PUBLICATIONS

Erzmetall, vol. 33, No. 2, 1980, pp. 70-76; Weinheim; J. Kruger et al: "Das Eisenproblem bei der Hydrometallurgischen Zinckgewinnung".
Erzmetall, vol. 34, No. 7/8, Jul. 1981, pp. 380-387; Weinheim; J. Kruger et al; "Uberlegungen Zum Eisenproblem bei der hydrometallurgischen Zinkgewinnung".
Patents Abstracts of Japan, vol. 8, No. 102 (C-222) [1539], May 12th, 1984; JP A 59 16 919 (Jiyuushitsuyu Taisaku Gijutsu Kenkiyuu Kumiai) 28-01-1984.
M. M. Lakernik and G. N. Pakhomova, Zinc and Cadmium Metallurgy Metallurgia Publishers, Moscow, 1969, pp. 81-111 and 250-262.

Primary Examiner—Robert L. Stoll
Attorney, Agent, or Firm—Rogers, Bereskin & Parr

[57] ABSTRACT

A process is described for the controlled oxidation roasting of zinc bearing sulphidic ores and concentrates by adjusting the furnace temperature and residence time together with the oxygen availability to the sulphide retention requirements in the calcine. The obtained calcine is subsequently subjected to various physical and chemical process steps to separate the unreacted sulphides which are then dead roasted and treated for zinc recovery, according to one embodiment of the process. In another embodiment the separated, unreacted sulphides are returned to the controlled oxidation roasting step.

The chemical separation process steps include sulphur dioxide leaching. In one embodiment zinc is preferentially dissolved as sulphite and the solution obtained is further treated for zinc recovery. In other embodiments sulphuric acid, or ammonical ammonium carbonate or similar leaching reagents are used for the preferential dissolution of the zinc oxide present in the calcine.

13 Claims, 11 Drawing Sheets

LEGEND: ZINC CONCENTRATIONS IN EXAMPLE 2 (1)
IRON CONCENTRATIONS IN EXAMPLE 2 (*)

RECOVERY OF ZINC FROM ZINC BEARING SULPHIDIC ORES AND CONCENTRATES BY CONTROLLED OXIDATION ROASTING

This invention deals with recovering zinc from zinc and iron-bearing sulphides, which are either in the form of complex zinc, iron and non-ferrous metal containing sulphidic minerals, or in the form of zinc sulphide concentrates. Additionally the accompanying valuable non-ferrous metals may also be recovered.

Roasting processes for the recovery of zinc from its various sulphides have been known and described in the prior art. In most mineral deposits zinc sulphide minerals are accompanied by iron sulphides, and when roasted together in excess air the resulting calcine invariably contains these metals combined as zinc ferrite. In order to obtain the zinc in a recoverable form, the ferrites formed have to be treated separately and the subsequent separation of iron oxide from the zinc-bearing compounds requires several costly process steps. In commercial zinc plants, which utilize hydrometallurgical processes, zinc and iron are separated from the zinc-containing residues by leaching in hot, concentrated sulphuric acid. This enables the zinc to be subsequently extracted in a neutral leach circuit. The separated iron is precipitated either as jarosite, geothite or hematite, according to various technologies. These steps necessarily incur high capital and operating costs because of the nature of the leaching medium and of the precipitates. Reagent and disposal costs can also be substantial.

Highly corrosive acid treatments are damaging to both environment and operating plants. In addition the likelihood of sulphur oxides in the atmosphere requires the use of expensive pollution controlling devices.

Other methods for the roasting of zinc sulphides for the recovery of zinc include sulphation roasting, as taught for example, by Coolbaugh et al. in U.S. Pat No. 1,657,711 and by Brinker in U.S. Pat. No. 1,749,125. The sulphation roast, however, needs to be carried out at lower temperatures, such as generally less than 800° C., at which reaction rates are much slower; and with the attendant polluting gas formation. Furthermore, none of the sulphation processes solve the problems of ferrite formation satisfactorily.

In conventional zinc recovery processes, the zinc sulphide-bearing minerals which also contain iron, are dead roasted at temperatures in the range of 850°-1050° C., such that essentially all the iron present is converted to zinc ferrite and only the remainder of the zinc present is in the form of zinc oxide.

A novel process has now been found for the recovery of zinc from sulphidic zinc-bearing ores and concentrates wherein controlled oxidation roasting is utilized to retain a portion of the sulphides in the calcine thereby retarding zinc ferrite formation, and to produce a sulphur dioxide-containing gas.

In one embodiment of the invention sulphidic zinc concentrates are subjected to controlled oxidation roasting at 700°-1050° C. and the partially oxidized calcine is subsequently separated by physical means to a zinc fraction and to an iron fraction. The zinc fraction is then roasted in excess ar and zinc is recovered from the zinc-rich calcine. The iron fraction of the calcine may be leached in aqueous sulphur dioxide, and the subsequently precipitated zinc sulphites are returned to the controlled oxidation roasting step.

In another embodiment of the invention sulphidic zinc and other non-ferrous metal bearing concentrates are subjected to controlled oxidation roasting at 700°-1050° C. and the obtained partially oxidized calcine is treated by sulphur dioxide leaching process steps in more than one stage, to separate sulphidic zinc bearing compounds from oxidic compounds. The oxidic fraction dissolved in the aqueous sulphur dioxide leachate in more than one stage, is providing a first impure zinc sulphite solution and a second predominantly iron bearing solution. The impure zinc sulphite is precipitated from its solution and returned to the controlled oxidation roasting step. The iron oxide and non-ferrous metal oxides are subsequently recovered from second aqueous sulphur dioxide solution.

In a third embodiment of the invention sulphidic zinc bearing concentrates are subjected to controlled oxidation roasting at 700°-1050° C. to yield a partially oxidized calcine which also contains unreacted sulphides, and sulphur dioxide. The unreacted sulphides in the calcine are separated and returned to the controlled oxidation step. The sulphide free calcine may be subsequently subjected to physical separation and leaching steps to obtain zinc-rich and iron-rich fractions. Zinc is recovered from the zinc-rich fraction, and the impure zinc and other non-ferrous metals contained in the iron-rich fraction may be recovered by subsequent process steps.

The preferred embodiments of the present invention will be illustrated by the following diagrams.

The preferred embodiments of the present invention will be described and illustrated by means of examples below.

The zinc sulphide bearing ores and concentrates are usually first treated by specific beneficiating and mineral processing steps and dried, then charged to a furnace to be roasted according to the present process.

The roasting operation is conducted in the temperature range of 700°-1050° C. to expedite oxidation and simultaneously prevent sulphation by using an oxygen-deficient atmosphere such that the period of contact between sulphidic mineral particles and the oxygen is essentially controlled, and thus the conversion of the sulphide minerals to ferrites will be substantially retarded. This is accomplished by producing a partially oxidized roaster product.

Controlled limited oxidation during the roasting step will predominantly oxidize the iron bearing sulphides, and only to a limited degree the zinc sulphides and thus retard the formation of ferrite. The control will usually be conducted in such a manner that 5-75% of the sulphide sulphur initially present will be left in the partially roasted product. The controlled oxidation is attained by adjusting the amount of available oxygen during roasting, furnace temperature, the residence time and the composition of the gas atmosphere in which the roasted product is allowed to cool. In specific instances the range of the residual sulphur may vary depending on the quantity and nature of the iron-containing components in the roaster feed material. As a general principle for the purposes of zinc extraction by the present process, the partially roasted calcine will retain between 2–26 wt. % of sulphide sulphur before being subjected to further separation treatment steps.

The selection of the level of sulphide remaining in the roasted concentrate will depend on the nature of the subsequent processing steps for the separation of iron in the product from the zinc and other non-ferrous metals initially present in the concentrate. The partially oxidized calcine will normally contain zinc oxide, incompletely oxidized iron oxides, as well as zinc sulphides, and is subsequently treated according to one of the embodiments using physical and chemical methods to separate the various components.

In one embodiment an iron-containing zinc sulphide concentrate is fed to a controlled oxidation roaster. The roaster operates at a temperature between 700°–1050° C. The air or oxygen-containing gas is fed to the roaster at a rate such that the partially oxidized roaster product will contain sufficient sulphide sulphur to account for most of the non-ferrous metal sulphides in the concentrate feed material. Thus the main components of the product will be unreacted non-ferrous metal sulphides and iron oxides. Minor amounts of non-ferrous metal oxides will also be present in the product.

Figure 1:
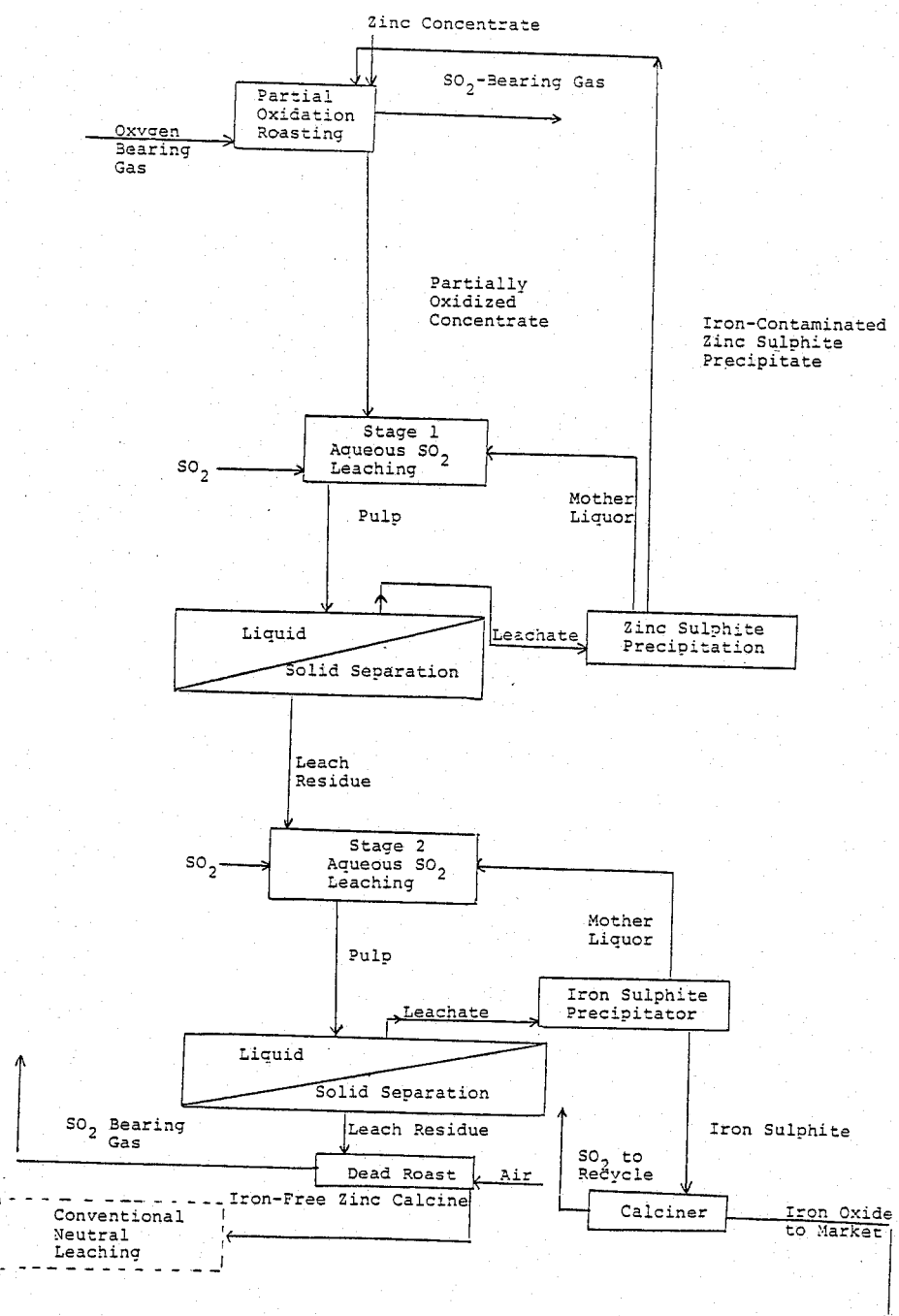
FIGS. 1, 2, 3, 4 and 5 represent flowsheets incorporating the various embodiments of the present process, showing variations in the zinc extraction process steps.

The roasting is carried out in any suitable furnace which allows control of the feed gas flow and the feed concentrate flow, as well as intimate mixing of the gas and solid phases during roasting. The calcine obtained may be cooled as it leaves the roaster in a controlled atmosphere to minimize further oxidation during cooling. The flowsheet of this process is schematically shown in FIG. 1.

The partially roasted product is subjected to aqueous $SO_2$ leaching in two stages. The first stage leach serves to leach out any zinc oxides formed during roasting in preference to iron oxides and unreacted sulphides. The leachate from the first stage is treated to produce zinc sulphite contaminated with iron and this product is recycled to the partial oxidation roaster.

The residue from the first stage is then sbjected to a second aqueous $SO_2$ leach stage for a suitable reaction period and temperature, to dissolve the bulk of the iron oxide, leaving the unreacted sulphides in the residue. The relatively iron-free unreacted sulphide residue from this second leaching stage is then subjected to conventional oxidizing roasting to convert relatively iron-free sulphides to their oxides which may then be leached by conventional techniques. The second stage leachate is treated to precipitate iron sulphite. Iron oxide, formed by calcining this precipitate, may be further treated as the market requires it.

Variations of this embodiment of the invention relate to the methods of treating the partially oxidized concentrates. Selective leaching may be performed using other lixiviants including sulphuric acid, aqueous ammonia and carbon dioxide solutions, or aqueous ammonia and $SO_2$ solutions.

One variation of this embodiment of the invention applies physical methods for separating the sulphides from the oxides such as froth flotation or magnetic separation, preceded by shatter milling and screening. Following the physical separation step, selective leaching may be used to separate iron oxides from zinc and other non-ferrous metal oxides.

A second embodiment of the invention employs single-stage roasting rather than two-stage roasting.

Dependent upon the nature of the zinc sulphide ore, or concentrate to be treated, the controlled oxidation in this case is such that only 2–14% of sulphide sulphur is allowed to remain in the partially oxidized concentrate.

The cooled calcine produced in this instance is subjected to a mild comminution treatment such as shatter milling in order to liberate the oxides formed during roasting from the unreacted sulphides. The iron oxides being in a magnetic form, are then separated from unreacted sulphides and zinc and other oxides, by magnetic separation.

After the iron separation step, the calcine is composed of zinc oxide with some unreacted sulphides. The unroasted sulphides are separated from the zinc oxide by physical methods and are recycled to the roaster.

The resultant calcine after the physical separation step is predominantly iron-free zinc oxide, and is fed to a conventional neutral sulphuric acid leach. This embodiment is shown in flowsheet form in FIG. 2.

Figure 2:
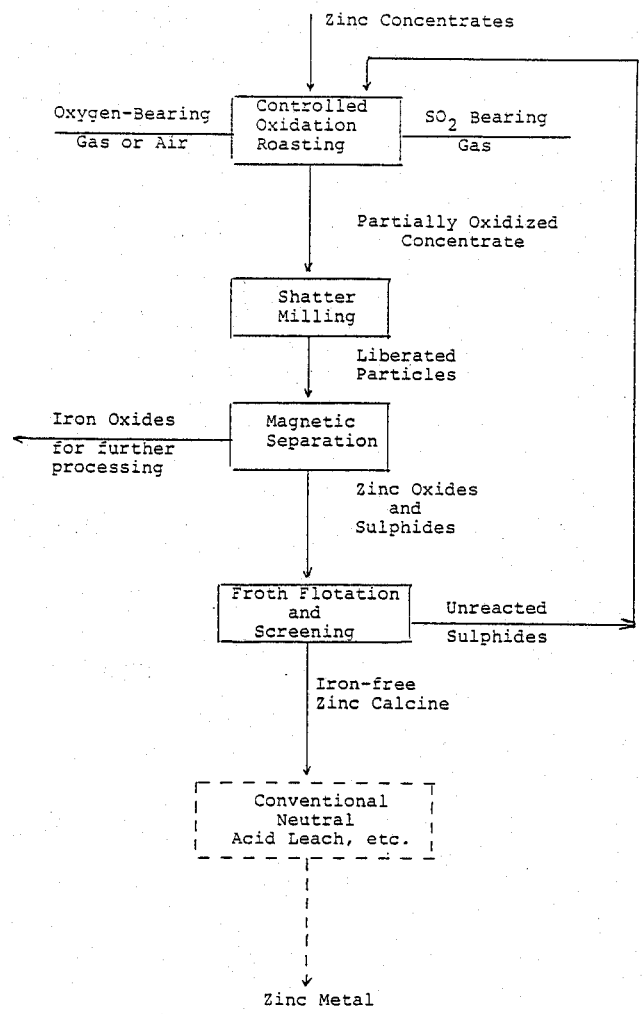
Figure 3:
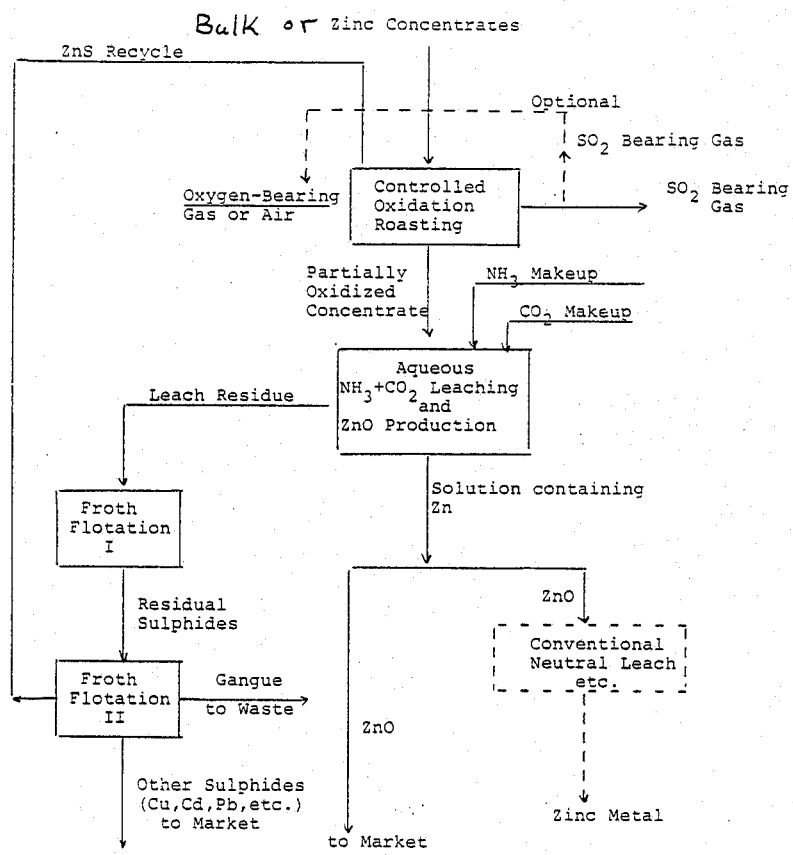

Another variation of the second embodiment of this invention is shown in FIG. 3. The physical separation methods employed in FIG. 2 are replaced in part by an aqueous ammonia and carbon dioxide leach step in the process of FIG. 3.

Figure 4:
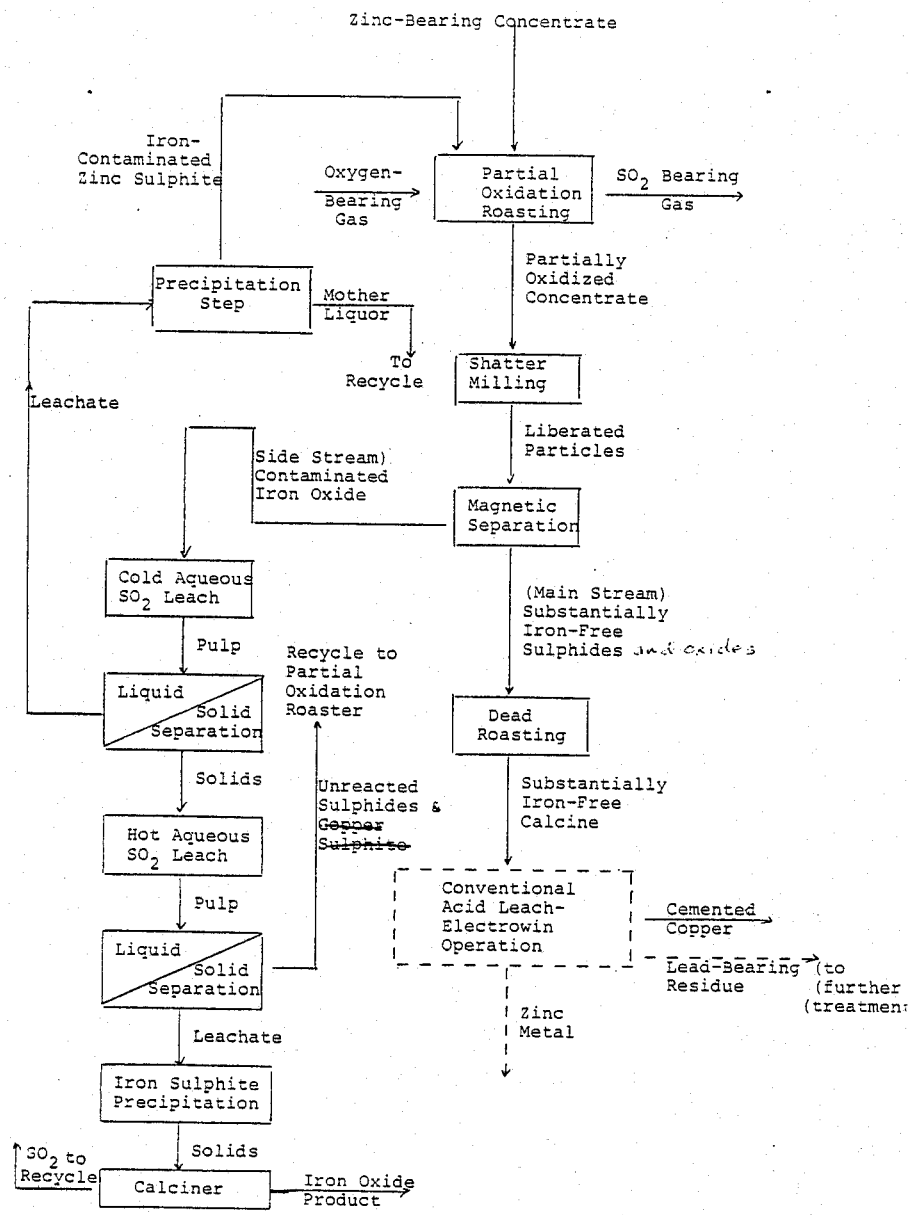

Alternatively, the separated zinc bearing fraction which now contains very little iron, can be further treated by one of the conventional methods for the recovery of zinc and accompanying non-ferrous metals such as copper, cadmium, or traces of precious metals. The conventional treatment can take the form of dead roasting and subsequent sulphuric acid dissolution. A possible sequence of process steps treating zinc-bearing bulk concentrate is shown in FIG. 4.

Figure 5:
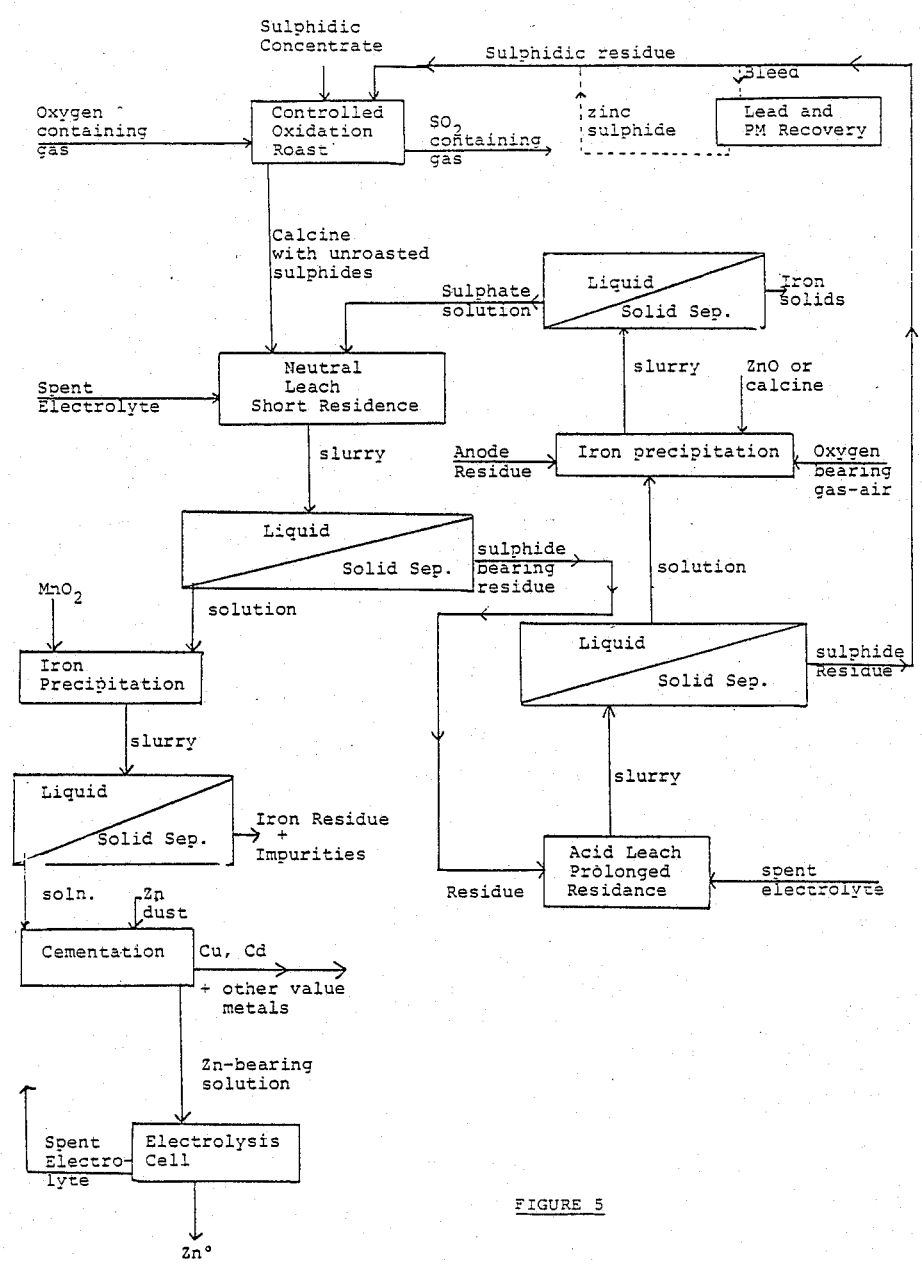

Another zinc recovery process utilizing the roasting conditions of the present invention is shown in FIG. 5.

Zinc sulphide concentrate is fed to a controlled oxidation roaster, operating at a temperature between 700° C. and 1050° C. in a manner to limit the period of contact with an oxygen-containing feed gas, so that the calcine leaving the roaster contains up to 2 to 14% sulphur as sulphides.

The calcine, after cooling, is fed to one or more neutral sulphuric acid leaching vessels together with spent electrolyte or its equivalent. Leaching is conducted in the pH range of 4 to 5 for a relatively short period of time with the aim of dissolving the major portion of the soluble zinc and only a minor portion of the soluble iron. Subsequent to this operation, the resultant slurry undergoes a liquid-solid separation step to separate the impure zinc sulphate solution from the undissolved residue. The impure zinc sulphate solution is treated with manganese dioxide to precipitate the additionally dissolved iron. This iron-containing precipitate is subsequently separated from the sulphate solution, which contains substantially only zinc.

Other impurities are separated by conventional means, and following this step the purified zinc sulphate solution is subjected to electrolysis to produce zinc metal.

The residue after the neutral leaching contains unreacted sulphides, some zinc oxide and most of the iron oxide; the latter chiefly in the acid soluble stage. This residue is fed to one or more acid leach vessel for a more prolonged contact with an additional quantity of spent electrolyte. The leaching period in this instance is several hours, in order to dissolve not only the remaining soluble zinc but substantially all of the acid-soluble iron.

The slurry from this operation is fed to suitable liquid-solid separation equipment to separate the leachate from the leach residue. The leach residue contains all of the unreacted sulphides as well as silicates and similar gangue materials. This residue is recycled to the roaster.

The leachate from the acid leach operation is fed to an aeration vessel to convert iron to crystalline goethite. Some zinc oxide or zinc calcine is fed to the aeration vessel where finely dispersed air or oxygen is added to permit the oxidation/precipitation to take place.

The precipitated iron-bearing solids are separated, the purified zinc sulphate solution is returned to the neutral leaching step, and ultimately to the electrolytic recovery of zinc.

The recycling of the sulphide residue to the controlled oxidation roaster would normally result in a build-up of unwanted sulphides, such as lead sulphide as well as unwanted silicates. This is prevented by taking a bleed stream off the recycled sulphides. The bleed stream may be subjected to conventional separation steps, by first separating silicate and then the precious metal-bearing lead sulphide. Other conventional separating processes may also be applied. The remaining zinc sulphides are returned to the controlled oxidation roasting step.

If the lead sulphide and silicate levels in the sulphide residue warrant it, the entire residue may be treated according to the preceding conventional separation steps.

The following examples illustrate applications of the present roasting process to zinc extraction methods.

EXAMPLE 1

Small samples of high grade zinc sulphide ore were roasted in air, to test how the amount of available oxygen would affect the physical properties of the resulting calcine:

3 gram weights of ground zinc sulphide ore, in separate refractory boats were heated simultaneously at 800° C. for one hour. One boat was uncovered during the entire heating period, that is the access of air was unrestricted; the second boat was covered with a loose fitting cover. Thus, in the second case the accessibility of oxygen was reduced by a limited degree. After heating, both samples were quenched in water, and were subjected to testing for magnetic components by a Davis Magnetic Tube separator. It was observed that the sample heated in a reduced supply of oxygen had 6.6% magnetic material present, while the sample which had been roasted in unlimited supply of air had none.

The high grade ore was shown by analysis in its limited oxidation condition to contain 8.0% by weight iron. Thus the presence of 6.6% magnetic iron oxide in the second sample indicates that reducing the accessibility of oxygen during roasting will result in a substantial reduction of non-magnetic ferrite formation.

EXAMPLE 2

A small quantity, approximately ½lb. of zinc concentrate was roasted at 925° C. in a feed gas containing 3% oxygen for 2 hours. After this heating period the calcine was withdrawn and cooled rapidly by water quenching. The calcine was subsequently leached at low pH and close to ambient temperature with $SO_2$ sparging and stirring. Feed and calcine composition is shown in Table I.

TABLE I

| | COMPOSITION IN WEIGHT % | | | | | |
|---|---|---|---|---|---|---|
| | Average Particle Size μm | Zn | Fe Total | Cu | Cd | S Total | S as $SO_4^{2-}$ |
| Feed Material | 190 | 51.4 | 8.21 | 0.85 | 0.25 | 32.0 | N/A |
| Calcine | ~110 | 59.9 | 9.35 | 1.06 | 0.06 | 23.7 | 0.10 |

Leach Conditions: 34.02 g calcine was suspended in 421 ml of liquid. Temperature 29±3° C., pH: 1.2 average, Duration: 60 minutes.

TABLE II

| METALS DISSOLVED BY LEACHING AT THE END OF THE LEACH PERIOD | | | | |
|---|---|---|---|---|
| | Zn | Fe | Cu | Cd |
| As g/L concentration in leach liquor | 6.5 | 2.46 | 0.199 | 0.004 |
| As % Extraction based on wt. % in calcine | 13.3 | 31.4 | 23.1 | 8.5 |

Figure 6:
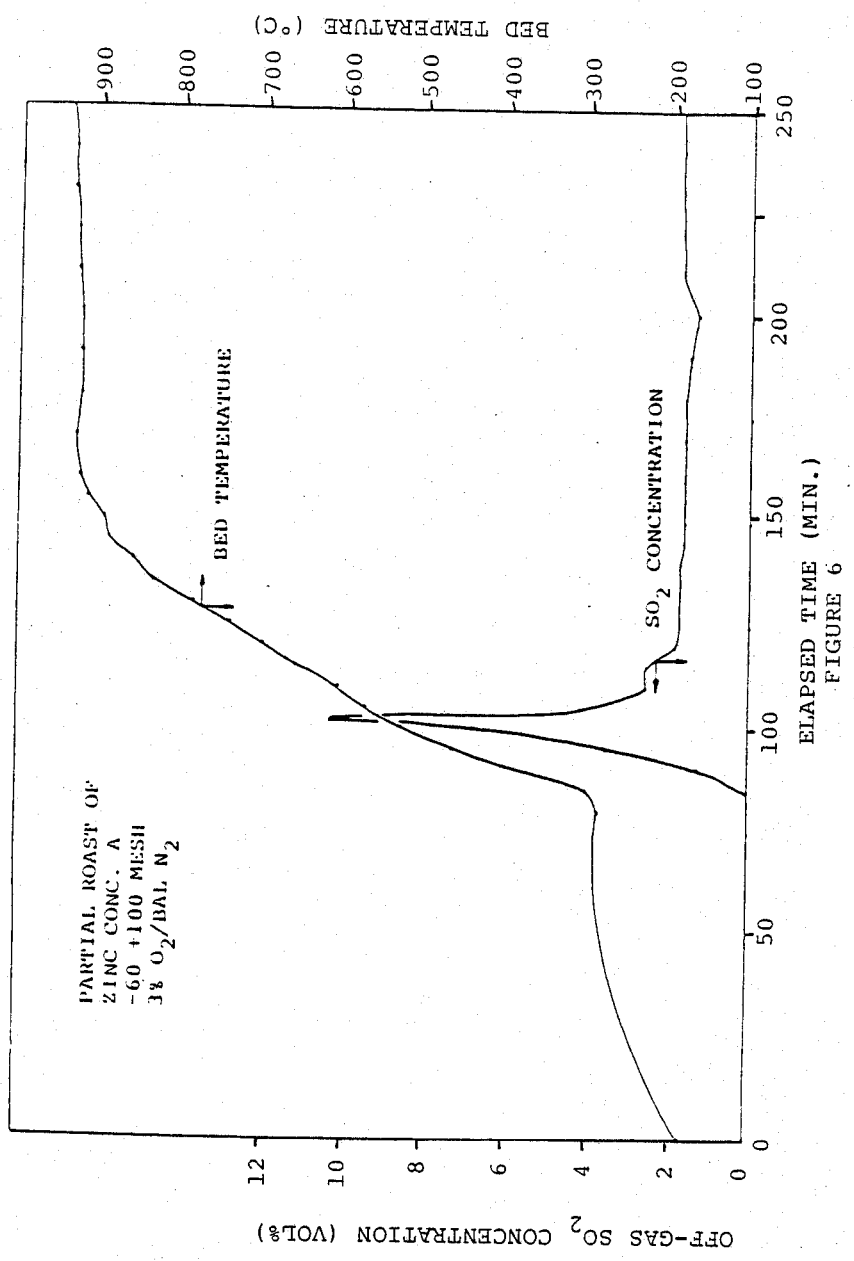
FIG. 6 shows a temperature and furnace atmosphere profile during roasting.

The roast conditions are shown by a roasting profile in FIG. 6. The two profiles represent the increase in temperature in the furnace and the sulphur dioxide concentration in the roaster off-gas during the four hour roasting period of the feed material indicated in Table I.

It can be seen that a substantial portion of the iron was dissolved by $SO_2$ leaching, indicating that most of the iron in the calcine is not in the form of ferrite, since ferrite would not be soluble under the conditions of this example. Only a small portion of the zinc dissolved, leaving the bulk of the zinc to be recovered by conventional processes. Simultaneous dissolution rate studies showed that 11.4% of the zinc, that is most of the soluble zinc, dissolved after three minutes of leaching, whereas only 6.9% of the iron dissolved during this period; indicating that a first stage leach will dissolve predominantly zinc, and a second stage leach will dissolve predominantly iron. It was also noted that the iron was still dissolving at a considerable rate after 60 minutes leaching time, whereas the zinc dissolution was levelling off and had only risen from 11.4% to 13.3% between the 3 minutes initial leaching and the 60 minutes of the total leaching period.

Figure 7:
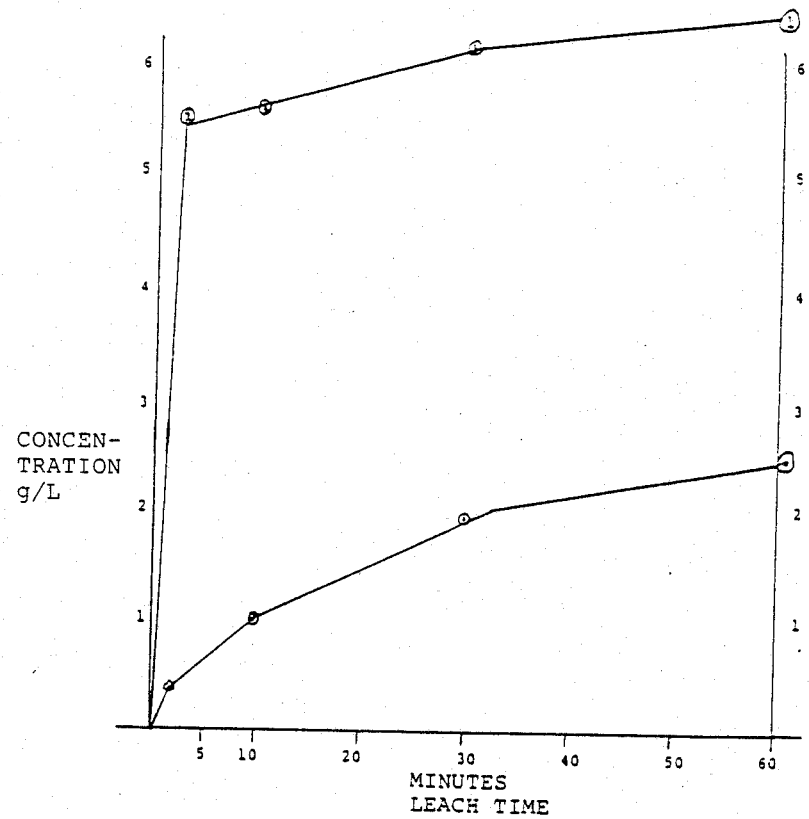
FIG. 7 shows the dissolution rates of iron and zinc from a calcine obtained in one embodiment of the present invention.

The differences in the respective dissolution rates of iron and zinc are further illustrated in FIG. 7, where the concentrations in the leach solution are plotted as a function of time during the leach period. Virtually all the soluble zinc goes into solution in the beginning of the leach period, while the iron concentration continues to increase during the whole time interval.

If the zinc and iron were present combined as zinc ferrite, the rate of increase of their concentrations would be expected to be the same. The graphs of FIG. 7 clearly show that most of the zinc dissolved was not chemically bonded to iron oxides.

EXAMPLE 3

Figure 8:
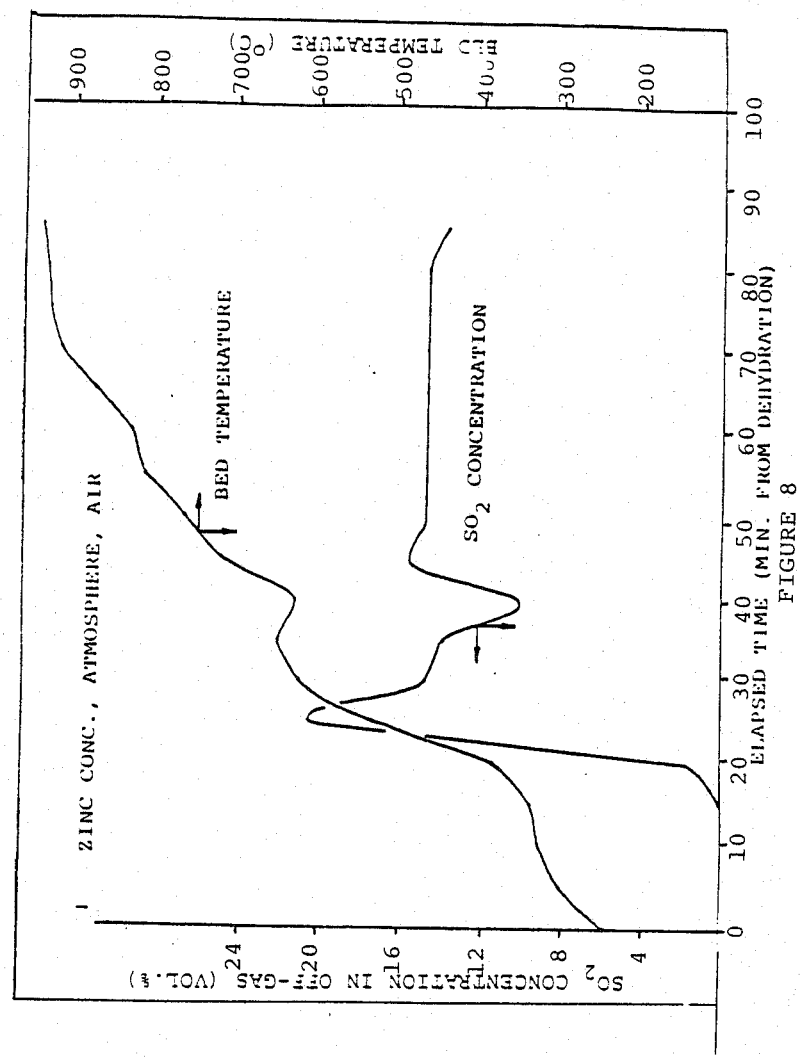
FIG. 8 shows temperature and gas composition profiles in the furnace during a controlled oxidation roast.

Zinc concentrate having a feed composition shown in Table III, was roasted in air in a temperature range of 885°-955° C. The roasting profile and duration are shown in FIG. 8. The start of the time period was taken from the loss of moisture in the sample. The bed temperature increased steadily to 800° C. in about 60 minutes and the sulphur dioxide evolution peaked after 25 minutes when the sample temperature was around 550° C. The profiles allow stipulation that the iron sulphides have reached a first oxidation state around 500° C. It can be seen that the level of sulphur dioxide concentration in the gas is steady till the end of the roasting period. The calcine was allowed to cool in its own atmosphere, and subsequently analyzed. The results of the analysis, indicating 7.1% retained sulphur, are shown in Table III.

TABLE III

| | Particle size μm | Zn wt % | Fe wt % | Cu + Cd | S wt % |
|---|---|---|---|---|---|
| Feed | 137 | 54.8 | 6.83 | 1.36 | 35.8 |
| Calcine | 130 | 67.2 | 6.23 | 1.73 | 7.1 |

The calcine was then leached in ammoniacal ammonium carbonate solution, by feeding carbon dioxide and ammonia gas into an aqueous slurry of the calcine at pH=11 and at 50° C. 99% of the zinc oxide indicated to be in the calcine was extracted into the leach liquor, eaving substantially all the iron oxides and the unreacted sulphides in the residue. The zinc in the ammoniacal leach liquor was treated for recovery by conventional techniques.

This example illustrates the beneficial effects of the controlled oxidation of sulphidic zinc concentrate to attain a residual sulphur of 7.1% in the calcine, allowing the separation of most of the zinc from the unreacted sulphides and iron bearing compounds.

EXAMPLE 4

A batch of zinc concentrate with a feed composition shown in Table IV below, was roasted in two stages; the first stage being conducted in a deficiency of oxygen and the second stage being a dead roast.

The first stage of the roast was conducted at 700° C. to retain 55% of the sulphur initially present. The second stage was conducted at 865° C.

The calcine obtained in the two-stage roast was washed to remove soluble sulphates and was subsequently leached in aqueous sulphur dioxide at a pulp density of 120 g/L.

TABLE IV

| | Zn wt % | Fe wt % | S wt % |
|---|---|---|---|
| Feed | 55.1 | 7.0 | 35.6 |
| Calcine (2 stage) | 67.1 | 7.16 | 0.28 |

A grab sample was taken after 189 minutes of total roasting time, at the beginning of the second stage when the temperature of the furnace reached 835° C. The sample was analyzed and was found to contain 10.9% sulphur by weight and iron was reported to be predominantly ferrous iron. The results indicate that very little, if any, iron was oxidized to the ferritic state at the beginning of the second stage of the roast.

EXAMPLE 5

A zinc concentrate of the same composition as in Example 2 was roasted at temperatures slightly higher than 900° C. for 45 minutes in an atmosphere containing 11% oxygen. Composition of calcine is shown in Table V.

Figure 9:
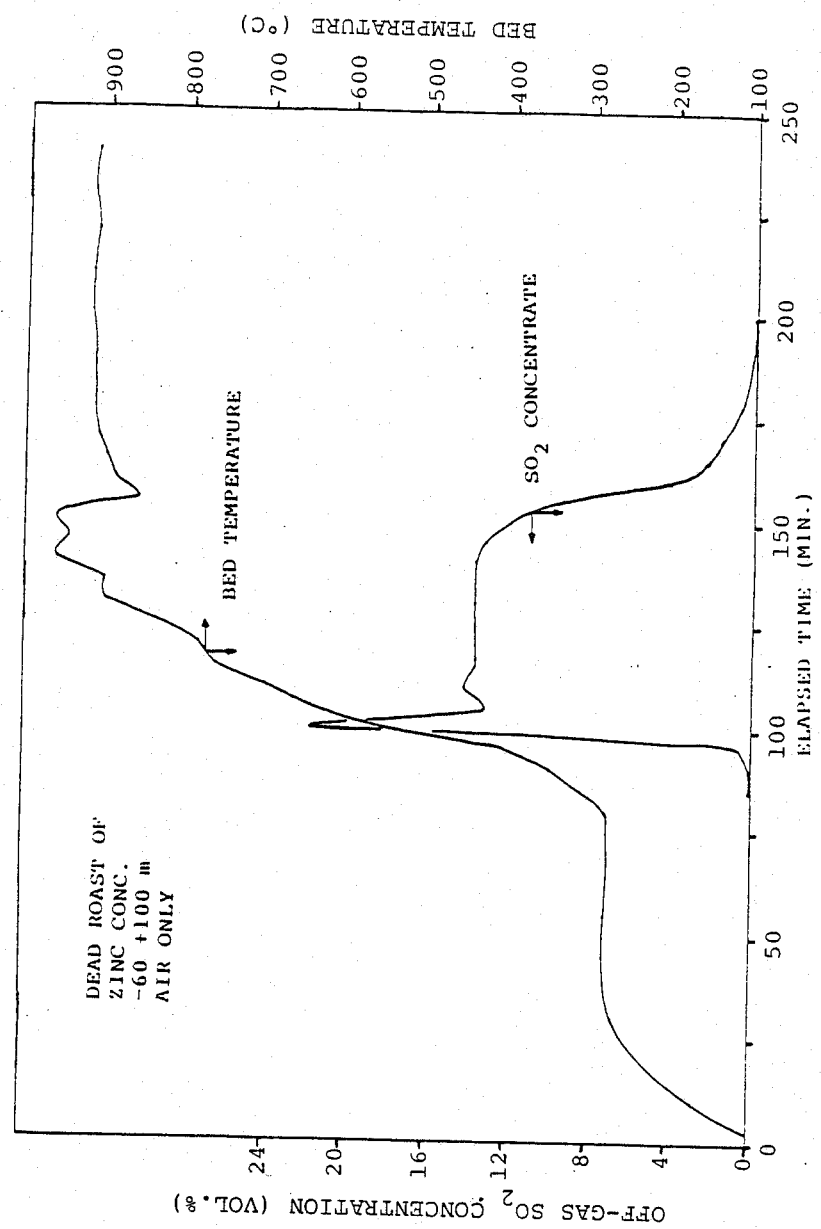
FIG. 9 shows temperature and gas composition profiles in the furnace during an uncontrolled oxidation roast.

Roasting conditions are shown in FIG. 9. The line representing the temperature indicates that there was rapid heating of the sample from about 250° C.-960° C., followed by a levelling off at 900° C. for a period close to 2 hours. The sulphur dioxide level in the gas phase peaked as the sample reached about 550° C., levelled off then dropped to virtually zero in the last two hours of roasting, indicating that all the sulphides present had been converted to oxides.

The calcine was quenched, suspended in water and leached with SO2 sparging as in Example 2. The leaching conditions, analysis of leach liquor and degree of dissolution are summarized below and are shown in Table VI.

34.02 g of calcine was used to form 426 ml aqueous suspension. Leach temperature varied from 25° to 47° C. Duration: 60 minutes.

Thus it can be seen that when roasted under improperly controlled oxidizing conditions most of the iron is present as ferrite which will not be leachable under the conditions described by this example. A substantial part of the zinc together with the iron in the ferrous form will be dissolved by the aqueous sulphur dioxide, thus producing an impure leach liquor, from which the iron will have to be removed to allow the recovery of purified zinc.

TABLE V

| FEED AND CALCINE COMPOSITION IN WT. % | | | | | | | |
|---|---|---|---|---|---|---|---|
| | Average Particle Size μm | Zn | Fe Total | Fe as Fe(II) | Cu | Cd | Total | S as $SO_4^{2-}$ |
| Feed Material | 190 | 51.4 | 8.21 | N/A | 0.85 | 0.25 | 32.0 | N/A |
| Calcine | ~110 | 63.1 | 11.5 | 3.70 | 1.27 | 0.10 | 0.39 | 0.16 |

TABLE VI

| | Zn | Fe | Cu | Cd |
|---|---|---|---|---|
| Metal dissolved, g/L | 44.3 | 0.65 | 0.55 | 0.04 |
| As % extraction based on wt. % in calcine | 87.5 | 7.1 | 51.2 | 48.5 |

EXAMPLE 6

The laboratory roaster (10) used in this example has sintered quartz frit (12) at the lower end of the furnace tube. The thermocouple in thermocouple well (14) measured the temperature during roasting. The off-gases are cooled (16) passed through an optional cyclone sampler (18), then through a sulphur dioxide sampler (20), which has a lead to the sulphur dioxide analyzer (22). The feed gases are introduced through flow meters (23) and (24), and preheated by coil heater (26).

Figure 10:
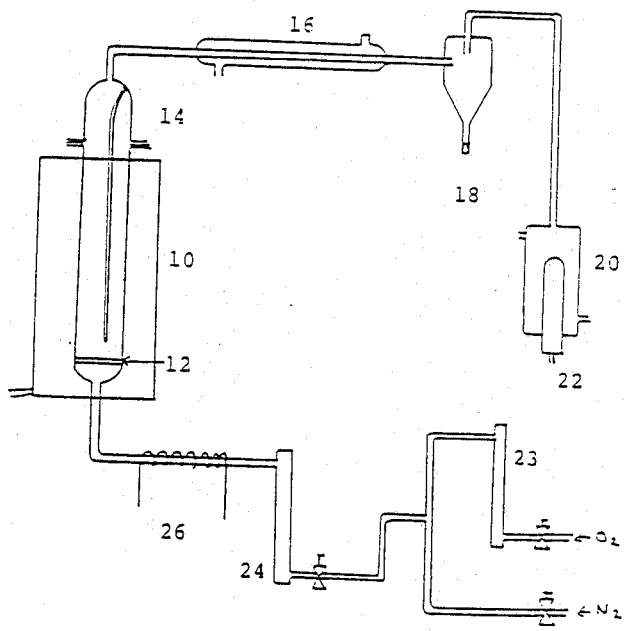
FIG. 10 shows a laboratory roasting apparatus.

130 g. of a zinc sulphide concentrate, containing 55 wt% of zinc and 9.2 wt % of iron, and having a particle size range of −120+170 mesh, was roasted in the laboratory roaster described above and shown in FIG. 10. The non-fluidized bed height was 4 cm. in the roaster.

Roasting bed temperature was 750° C., with a preheat temperature of about 250° C. The feed gas contained 3% oxygen with the balance being nitrogen. The total flowrate was adjusted to 5 liters per minute. Temperature and sulphur dioxide content of the roaster off-gas were continuously recorded.

A calibrated Miran sulphur dioxide analyzer was used to monitor and integrate the sulphur dioxide evolved during roasting and this method was used to determine the sulphur left as unreacted sulphides in the calcine. The roasting period was 24 minutes. At the end of the roasting period, the calcine was allowed to cool in an atmosphere of nitrogen. The feed material was roasted to retain 25 wt % sulphur in the calcine with the object that most of the sulphur be present as zinc sulphide.

The calcine was subsequently leached in 10% sulphuric acid solution. The leach liquor was analyzed for zinc and iron after 320 minutes of leaching period, and was found to contain 4% of the zinc present in the calcine and 40.5% of the iron present in the calcine. This shows that most of the zinc present in the feed is retained in the form of sulphide in the calcine, which dissolves in sulphuric acid only very slowly. Most of the iron sulphides, on the other hand, have oxidized to a form which is much more easily dissolved by sulphuric acid. Thus the iron is not present as zinc ferrite.

This example thus shows that by adjusting the calcine composition by the control of the amount of sulphur dioxide evolved during roasting a calcine is obtained which can be subsequently treated for separate zinc recovery.

EXAMPLE 7

Figure 11:
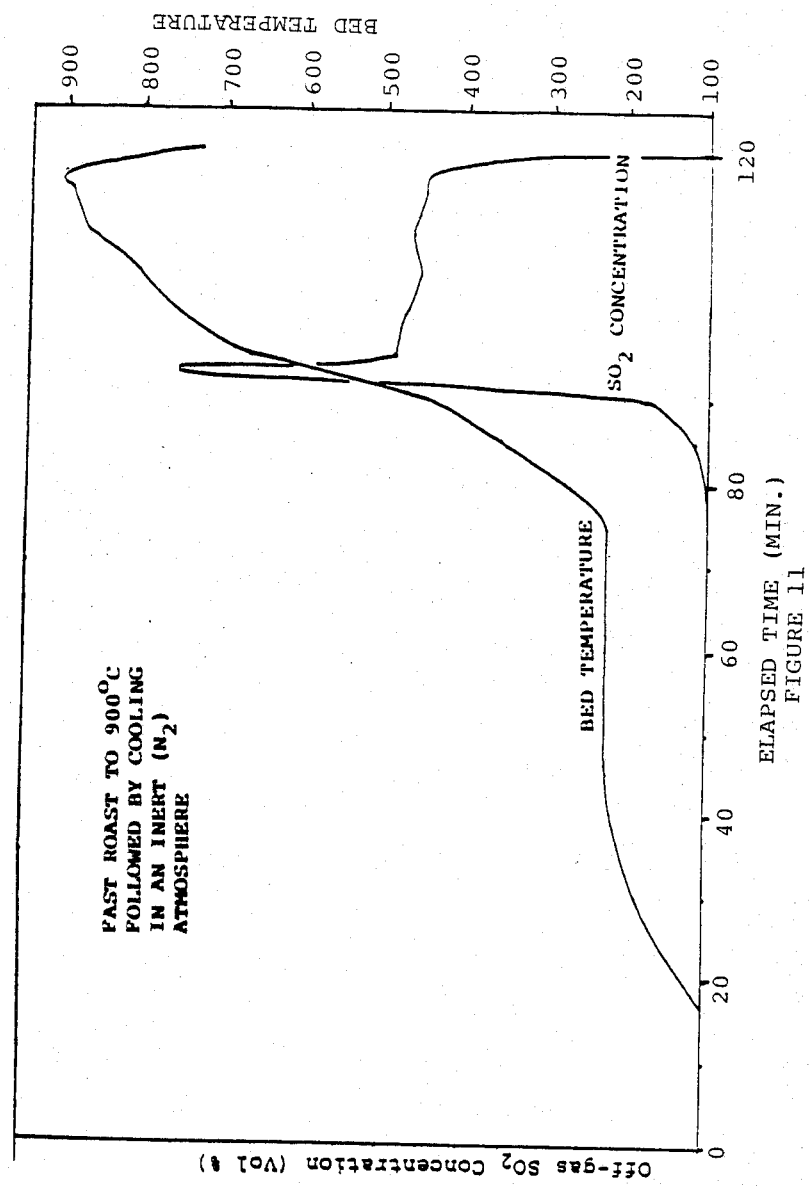
FIG. 11 is a temperature and gas composition profile when the roasting is conducted according to the present process.

Two samples of a zinc concentrate were roasted. One sample was roasted under uncontrolled oxidizing conditions, providing an essentially dead-roasted calcine; the second sample was roasted under controlled oxidizing conditions, as defined in the present invention. The second sample was found to have retained 17.3 wt. % sulphur as sulphide. The roasting was carried out by heating the dried sample in air in 40 minutes to 900° C., and subsequently cooling the roast products in nitrogen. Sulphur dioxide was generated by the sample peaking between 500° and 600° C., and then levelling off to a relatively constant level until roasting was stopped, as is indicated in FIG. 11. The respective compositions of the concentrate and the partially roasted calcine are tabulated in Table VII.

TABLE VII

| | Particle Size μm | Composition | | |
|---|---|---|---|---|
| | | Zn % | Fe % | S % |
| Concentrate | 190 | 51.20 | 8.24 | 32.0 |
| Partially Roasted Calcine | 120 | 58.3 | 9.9 | 17.3 |

The two calcines were first washed for less than 10 minutes in aqueous sulphur dioxide at ambient temperature and then leached separately in hot aqueous sulphur dioxide solution to indicate that the different roasting methods produced different compounds of iron and zinc in the partially roasted calcine A and in the dead roasted calcine B. The hot leach conditions are shown in Table VIII.

TABLE VIII

| Washed Calcine | Pulp Density g/L | Leach Temp. °C. | Leach Period min. | Final pH of Leachate | % of Iron dissolved in Leach Period |
|---|---|---|---|---|---|
| A (dead roast) | 59 | 70 | 60 | 1.70 | 10.6 |
| B (controlled oxidation) | 80 | 68.5 ± 0.5 | 60 | 2.5 | 60.7 |

It can be seen that the iron in the partially oxidized calcine is substantially more soluble in hot sulphurous acid than in the completely oxidized sample. Thus it can be concluded from the above example that the zinc and iron are not present in the form of zinc ferrite in the partially roasted calcine.

EXAMPLE 8

100 g of −140 mesh particle size zinc concentrate were roasted with sand in a fluidized bed furnace at 750° C. for 25 minutes in air. The concentrate contained 53.7% zinc, 6.8% iron, and 33.2% sulphur. The calcine obtained, containing 59.0% zinc, 6.6% iron, and 5.32% sulphur in the form of sulphide, was subjected to magnetic separation. The composition of the resulting magnetic and non-magnetic fractions is shown in Table IX.

TABLE IX

| | Zn wt % | Fe wt % | S wt % |
|---|---|---|---|
| Magnetic fraction | 26.4 | 29.0 | 3.6 |
| Non-magnetic fraction | 60.2 | 4.6 | 5.50 |

The above example shows rather exploratory conditions, however, it clearly indicates that the controlled oxidation process can be utilized for the physical separation of zinc-rich calcine fraction from iron-rich calcine fraction.

EXAMPLE 9

This example is intended to illustrate that zinc concentrate undergoes physical and chemical changes as it is roasted, and that by halting the roasting process at a suitable point, the calcine obtained will contain the iron and zinc compounds in substantially separable forms. The zinc concentrate samples were, in this example, heated to different temperatures and then analyzed by X-ray diffraction, electron microprobe and magnetic methods.

The results of the heating tests are summarized below:

| Temperature | | Predominant Components |
|---|---|---|
| 270° C. | non-magnetic | sphalerite (ZnS), pyrite (FeS$_2$), some chalcopyrite (CuFeS$_2$), |
| 710° C. | magnetic | sphalerite, pyrite, some iron oxides, |
| 790° C. | magnetic | sphalerite, ZnO, little pyrite, magnetite, amorphous copper minerals, |
| 890° C. | non-magnetic | ZnO, magnetite, hematite, Zn—Fe spinel, |
| ≧1000, dead roast | non-magnetic | ZnO, hematite, Zn—Fe spinel. |

We claim:

1. A process for the recovery of zinc from sulphidic zinc bearing ores and concentrates, comprising the steps of:
   (a) roasting a sulphidic zinc concentrate in contact with an oxygen bearing gas in the temperature range of 805°–1050° C. to obtain a calcine with a sulphur retention is said calcine between 50–75 wt. % of the sulphur initially present in said sulphidic concentrate;
   (b) subjecting said calcine to a physical separation process by at least one of the steps of magnetic separation and froth flotation to obtain an iron-rich fraction and a zinc fraction; and,
   (c) roasting said zinc fraction in stoichiometric excess oxygen to obtain zinc-rich calcine for zinc recovery.

2. A process according to claim 1 wherein said calcine is subjected to froth flotation and said iron fraction is subjected to magnetic separation for separation of iron bearing compounds from zinc bearing compounds, and said zinc bearing compounds are subjected to roasting step (c) of claim 1.

3. A process according to claim 1, wherein the sulphidic zinc concentrate is a bulk concentrate and the separated zinc fraction in step (b) also contains copper sulphides from which copper is subsequently recovered.

4. A process according to claim 1 wherein said iron-rich fraction is subjected to a first aqueous sulphur dioxide leach to obtain a first leach residue and a first leachate containing dissolved zinc; precipitating the dissolved zinc in the first leachate as zinc sulphite; subjecting the first leach residue to a second aqueous sulphur dioxide leach to obtain a second leachate containing dissolved iron and a second leach residue containing undissolved zinc sulphide; and, subjecting said undissolved zinc sulphide to roasting step (c) of claim 1.

5. A process for the recovery of zinc from sulphidic zinc bearing ores and concentrates, comprising the steps of:
   (a) roasting a sulphidic zinc concentrate in contact with an oxygen bearing gas in the temperature range of 850°–1050° C. to obtain a calcine with a sulphur retention in said calcine between 50–75 wt. % of the sulphur initially present in said sulphidic concentrate;
   (b) leaching said calcine to produce a soluble oxidic fraction and an insoluble sulphidic zinc fraction; and,
   (c) roasting said insoluble sulphidic zinc fraction in a second roasting operation in stoichiometric excess oxygen, to obtain a zinc-rich calcine for zinc recovery.

6. A process for the recovery of zinc from sulphidic zinc bearing ores and concentrates, comprising the steps of:
   (a) roasting a sulphidic zinc concentrate in contact with an oxygen bearing gas in the temperature range of 850°–1050° C. to obtain a calcine with a sulphur retention in said calcine between 50–75 wt % of the sulphur initially present in said sulphidic concentrate;
   (b) subjecting said calcine to a first aqueous sulphur dioxide leach to obtain a first leach residue and a first leachate containing dissolved zinc and iron;
   (c) precipitating the dissolved zinc in the first leachate of step (b) as zinc sulphite
   (d) subjecting said first leach residue to a second aqueous sulphur dioxide leach to obtain a second leachate containing dissolved iron and a second leach residue containing undissolved zinc sulphide;
   (e) precipitating the dissolved iron in the second leachate of step (d) as iron sulphite;
   (f) roasting the second leach residue containing undissolved zinc sulphide in a second roasting operation in excess stoichiometric oxygen, to obtain a zinc-rich calcine for zinc recovery, and,
   (g) converting said precipitated iron sulphite of step (e) to an iron oxide product.

7. A process for the recovery of zinc from sulphidic zinc bearing ores and concentrates, comprising:
   (a) roasting a sulphidic zinc concentrate in contact with an oxygen bearing gas in the temperature range of 850°–1050° C. to obtain a calcine with a sulphur retention in said calcine between 5–50 wt. % of the sulphur initially present in said sulphidic concentrate;
   (b) leaching said calcine to obtain a leach residue which contains both iron bearing compounds and zinc bearing compounds and a zinc leachate suitable for zinc recovery;
   (c) subjecting said leach residue to magnetic separation to obtain an iron fraction and a zinc fraction;
   (d) subjecting said zinc fraction to froth flotation to remove lead and other base metal sulphides and silicates; and,
   (e) returning said zinc fraction to roasting step (a).

8. A process for the recovery of zinc from sulphidic zinc bearing ores and concentrates, comprising:
   (a) roasting a sulphidic zinc concentrate in contact with an oxygen bearing gas in the temperature range of 850°–1050° C. to obtain a calcine with a sulphur retention in said calcine between 5–50 wt. % of the sulphur initially present in said sulphidic concentrate;
   (b) leaching said calcine to obtain an insoluble iron oxide and an unreacted sulphide fraction and a soluble zinc fraction suitable for zinc recovery;
   (c) leaching said iron oxide and unreacted sulphide fraction for separation of iron bearing compounds from sulphidic zinc bearing compounds;
   (d) recycling said sulphidic zinc bearing compounds to roasting step (a);
   (e) taking a bleed stream off said sulphidic zinc bearing compounds from step (c) to remove silicates and lead sulphides.

9. A process for the recovery of zinc from sulphidic zinc bearing ores and concentrates, comprising:
   (a) roasting a sulphidic zinc concentrate in contact with an oxygen bearing gas in the temperature range of 850°–1050° C. to obtain a calcine with a sulphur retention in said calcine between 5–50 wt. % of the sulphur initially present in said sulphidic concentrate;
   (b) leaching said calcine to obtain an insoluble iron oxide and an unreacted sulphide fraction and a soluble zinc fraction suitable for zinc recovery;
   (c) subjecting said iron oxide and unreacted sulphide fraction to froth flotation for separation of sulphidic zinc bearing compounds from lead sulphides, iron oxides and silicates; and
   (d) returning said sulphidic zinc bearing compounds to roasting step (a).

10. A process according to claim 6, wherein the sulphidic zinc concentrate is a bulk concentrate and the separated sulphidic compounds in step (b) also contain copper sulphides from which copper is subsequently recovered.

11. A process according to claim 7, 8 or 9 wherein said leaching is performed using a lixiviant selected from the group consisting of sulphuric acid, aqueous ammonia and carbon dioxide solutions, and aqueous ammonia and $SO_2$ solutions.

12. A process according to claim 11 wherein said lixiviant is sulphuric acid.

13. A process according to claim 7, 8 or 9 wherein the sulphidic zinc concentrate is a bulk concentrate.

* * * * *

UNITED STATES PATENT AND TRADEMARK OFFICE
CERTIFICATE OF CORRECTION

PATENT NO. : 4,789,529

DATED : December 6, 1988

INVENTOR(S) : Murry C. Robinson; Donald W. Kirk; Bruce Jue

It is certified that error appears in the above-identified patent and that said Letters Patent is hereby corrected as shown below:

Claim 1, column 11, line 7, change "$805°$" to -- $850°$ --.

Signed and Sealed this

Twenty-fifth Day of July, 1989

Attest:

DONALD J. QUIGG

Attesting Officer

Commissioner of Patents and Trademarks